United States Patent
Casper

(10) Patent No.: US 6,413,032 B1
(45) Date of Patent: Jul. 2, 2002

(54) CYLINDER TRANSPORTER

(76) Inventor: Benjamin G. Casper, 171 N. Canal Blvd., Basin City, WA (US) 99343

( * ) Notice: Subject to any disclaimer, the term of this patent is extended or adjusted under 35 U.S.C. 154(b) by 0 days.

(21) Appl. No.: 09/453,652

(22) Filed: Dec. 3, 1999

(51) Int. Cl.$^7$ .............................. B62B 1/04; B62B 1/06
(52) U.S. Cl. ....................... 414/444; 414/447; 414/449; 280/47.24
(58) Field of Search .................. 414/444, 447, 414/449, 490; 280/47.18, 47.24, 79.6

(56) References Cited

U.S. PATENT DOCUMENTS

| | | | | |
|---|---|---|---|---|
| 1,866,887 A | * | 7/1932 | Gleason et al. | 414/449 |
| 2,576,048 A | * | 11/1951 | Schum | 414/447 |
| 2,893,580 A | * | 7/1959 | Fischer | 414/460 |
| 3,667,728 A | * | 6/1972 | Garelick | 414/447 |
| 3,706,461 A | | 12/1972 | Deval | 280/47.26 |
| 3,815,767 A | | 6/1974 | Lund | 214/383 |
| 3,873,118 A | | 3/1975 | Takagi | 280/47.2 |
| 3,913,762 A | | 10/1975 | Alexander | 214/506 |
| 4,136,889 A | | 1/1979 | Middleton | 280/30 |
| 5,080,387 A | * | 1/1992 | Ryals | 280/47.24 |
| 5,513,939 A | * | 5/1996 | Martin et al. | 414/447 |
| 5,658,118 A | | 8/1997 | Luca | 414/444 |
| 5,806,868 A | * | 9/1998 | Collins | 414/449 |
| 6,000,712 A | * | 12/1999 | Wu | 280/47.34 |
| 6,015,254 A | * | 1/2000 | Keeler | 414/447 |
| 6,244,603 B1 | * | 6/2001 | Rizzardi | 414/444 |

FOREIGN PATENT DOCUMENTS

| | | | | |
|---|---|---|---|---|
| SU | 1654091 | * | 6/1991 | 280/47.24 |
| SU | 1749098 | * | 7/1992 | 280/47.24 |

* cited by examiner

Primary Examiner—James W. Keenan
(74) Attorney, Agent, or Firm—Liebler, Ivey & Connor; Floyd E. Ivey

(57) ABSTRACT

An apparatus comprising a transporter. More particularly this invention relates to an apparatus that can be used to transport a large and heavy cylinder on a frame with easy maneuverability. The apparatus is designed mainly for use with propane cylinders that have legs, whereby the article is not lifted to be place on the transporter, instead the apparatus is slid or placed underneath the article without disturbing it.

7 Claims, 2 Drawing Sheets

CYLINDER TRANSPORTER

FIELD OF THE INVENTION

The present invention relates generally to manually operated transporter for the transportation of heavy objects and in particular, to a transporter suitable for the use with large horizontal propane tanks that have legs or are designed whereby a portion of the tank is off the ground.

BACKGROUND OF THE INVENTION

A variety of apparatus' are known in the prior art which are directed toward transporters, hand trucks or wheel barrows. The prior art has disclosed transporters for use with objects that can be lifted to be placed upon the device. However, such devices have not been usable where the object is heavy and large, whereby manual lifting of the object is unduly burdensome because of the object's weight, and/or dimensions.

In the propane industry, the propane tanks or propane cylinders are brought to a site for installation. These cylinders may weigh between 250 to 500 pounds. In order to move a cylinder, the custom of the industry is to have two or three people at a site. Often due to the size and weight of the cylinder, the cylinder is dragged. This dragging is undesirable because of the damage that may be caused to the ground, pavement or the cylinder. Additionally, it is often required that the cylinder be moved through narrow areas such as fence gates, doors or along side a dwelling, it is desirable to have a high degree of maneuverability of the cylinder. In order to have ease of movement of a cylinder without dragging or damaging the cylinder, ground or surroundings, it is desirable to have a cylinder upon a transporter.

It will be further appreciated by those skilled in the art that previously there has been no way to move a propane cylinder at a site without lifting an end of the cylinder manually off the ground, which is a difficult task. U.S. Pat. No. 3,706,461 to Devol shows a two wheeled wheelbarrow having a frame capable of carrying heavy loads. U.S. Pat. No. 5,658,118 to Luca reveals a device for transporting cylinders and a hook to attach to the cylinder for stabilization. U.S. Pat. No. 3,815,767 to Lund shows a two wheel device for moving a vertically placed drum and the conversion of the device to allow for drainage of the drum. U.S. Pat. No. 4,136,889 to Middleton shows a collapsible trolley, whereby the frame can be adjusted for different purposes. U.S. Pat. No. 3,873,118 to Shozo reveals the addition of a third wheel to convert a carrier for heavier loads. U.S. Pat. No. 3,913,762 to Alexander shows a retractable hook and strap for stabilization.

The patents referred to herein are provided herewith in an Information Disclosure Statement in accordance with 37 CFR 1.97.

SUMMARY OF THE INVENTION

In general it is an object of this invention to provide a transporter which can be employed without lifting the object. An additional object of the invention is to provide a transporter that is simple, easy and rapid to use. An object of the invention is provide a separable transporter, that can be installed at a site. Another object of the invention is to provide a transporter that can be mass produced at a relatively low cost, thereby encouraging its widespread use by the applicable industries, including the propane industry.

Still another object of the invention is to provide a transporter which not only lifts a cylinder off the ground, but additionally provides a high degree of maneuverability of the cylinder. In this regard, the transporter of the present invention lends itself readily to use with cylinders and can be moved with the slightest of effort by the handler. More specifically, an aim of the invention is to provide a transporter for use with cylinders whereby lifting of the cylinder would be burdensome. Another object of the invention is the allow one person to be able to move a cylinder with ease.

It is a further object of the invention to provide a transporter which securely maintains and supports the cylinder upon its frame. The present invention discloses a transporter with a means for attaching to the cylinder. The preferred embodiment of the invention is a frame including a handle and a base with a chain for attaching to or around the cylinder.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION OF THE PREFERRED EMBODIMENT(s)

Figure 1:
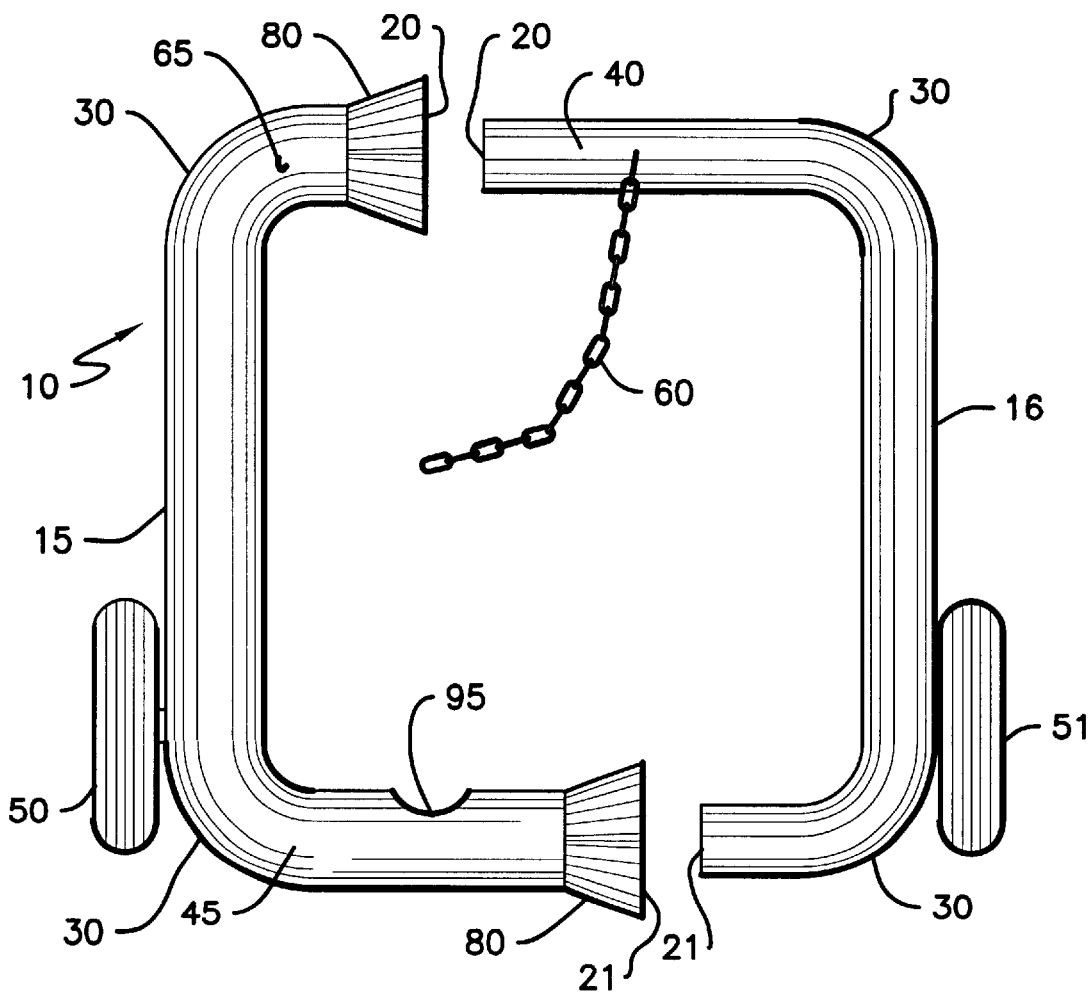
FIG. 1 is a perspective view of transporter showing the elongated members, wheels and securing means. Further shown are the bell joints, attaching means and the depression.
Figure 2:
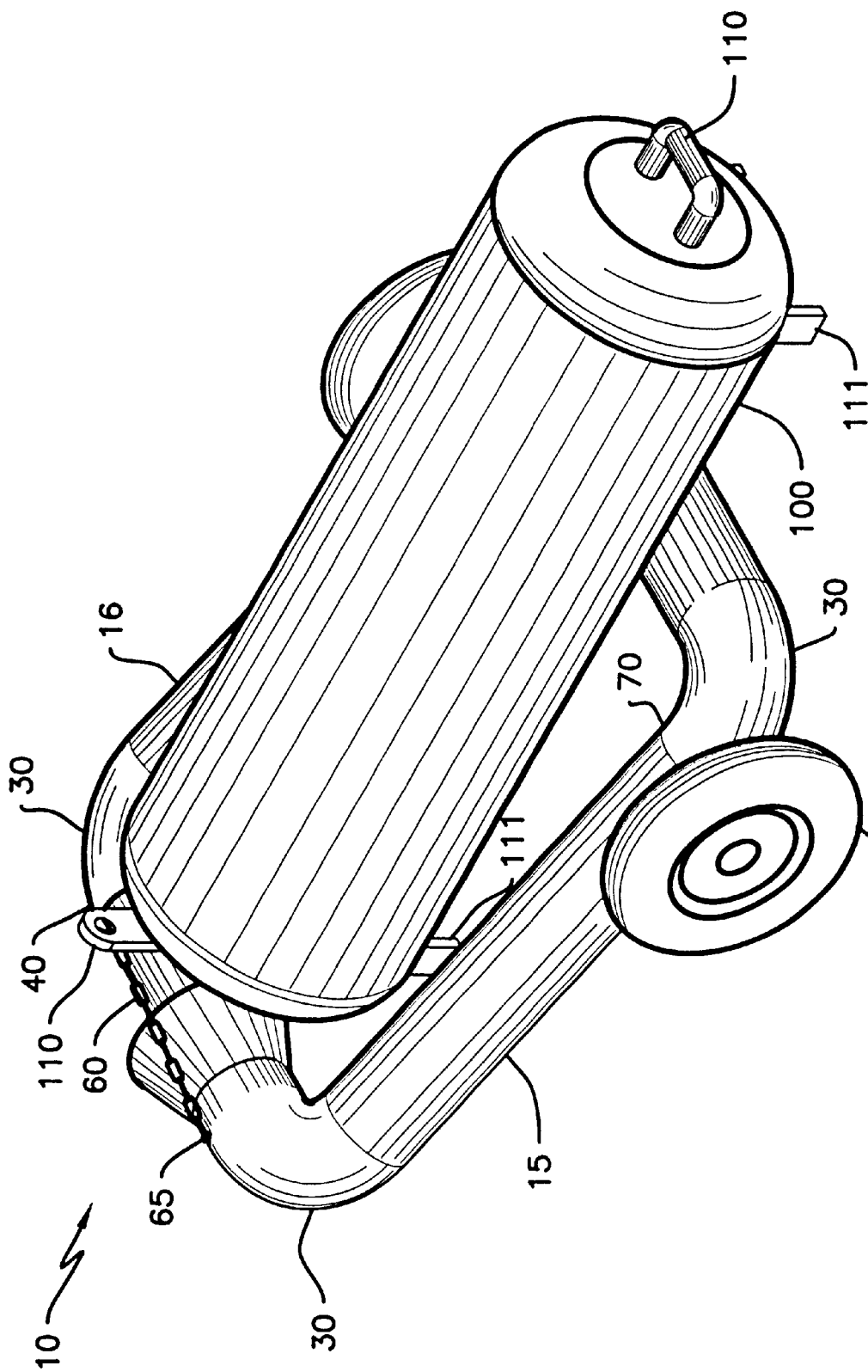
FIG. 2 is a perspective view of the transporter according to the present invention, shown in operation with respect to the cylinder.

The preferred embodiment of the transporter apparatus herein disclosed is depicted in FIGS. 1 through 2. FIG. 1 though FIG. 2 illustrate the transporter apparatus 10 which may comprise a frame including at least two elongated members 15, 16 having a first and a second end 20, 21. Each of the elongated members 15, 16 is curved 30 proximal the first end 20 and proximal the second end 21. The first ends 20 are connected by means forming a handle 40 and the second ends 21 are connected by means to form a base 45, whereby the interconnected elongated members 15, 16 share the same plane. The elongated members may be composed of any rigid material, including but not limited to metal or plastic. Additionally, the elongated members may be any shape suitable for constructing a frame, including but not limited to tubular. In the preferred embodiment, the elongated members are made of 1 ½ inch metal pipe.

The first and second ends 20, 21 may be connected by various different means including but not limited to a bell joint, a snap, bolt, clasp, clip or a pin. The connection means should be such to facilitate ease of connection and separation. The connection should not be made by any permanent means such as welding. The preferred connection means is a bell joint connection; when the second ends 21 are connected and the weight of the tank applied on the frame there is sufficient tension to make an additional connections means unnecessary. In the preferred embodiment, the two elongated members 15, 16 are tubular, wherein one first end 20 and one second end 21 of one of the two elongated members 15 is formed as a bell joint 80, to receive and secure the respective opposing first and second ends 20, 21 of the opposing elongated member 16. Either of the elongated members may have the bell joint. A bell joint is formed when the end of a pipe has a larger diameter for a certain length, then the diameter of the pipe becomes smaller at a point proximal to the end of the pipe. The change in diameter forms an edge such that when the opposite pipe is placed inside it does not extend beyond the edge. This type of bell joint and connection means are well known in the art.

The transporter also comprises at least one wheel 50, 51, affixed by means to each of the two elongated members 15, 16, intermediate the first and second ends 20, 21. These wheels 50, 51 are rotatably attached to the elongated members 15, 16. The wheels 50, 51 may be attached by but not limited to welding, bolts, or screws. It will be appreciated by those in the art the various ways to affix wheels to the elongated members 15, 16. The wheels 50, 51 can be affixed inside or outside the shape of the elongated members 15, 16. When the wheels 50, 51 are affixed inside the elongated member's shape, it would provide a narrower apparatus adding to the ease of maneuverability through narrow passages.

This transporter 10 may comprise a securing means 60 affixed intermediate said first and second ends. In the preferred embodiment the securing means 60 is affixed on the handle 40. The securing means 60 could include a chain, rope, bungee cord, elastic, or any other means that would provide securing and support to a cylinder 100. It will be appreciated by those in the art the various securing means for holding a cylinder 100. In the preferred embodiment the securing means is a chain. Propane cylinders 100 are usually equipped with a lifting lug 110, a handle or loop located at the top of each end, whereby the securing means 60 may be fastened to or looped through. This securing means 60 provides easier maneuverability as the cylinder 100 is secure within the frame. The securing means 60 may be adjusted to lift or lower the tank when on the transporter. When the securing means 60 is fastened to the cylinder 100, the cylinder 100 may be pushed or pulled by the handle 40. Alternatively, the cylinder 100 can be pushed or pulled by the front lifting lug 110, which is not attached to the transporter 10.

The apparatus 10 may further comprise an attaching means 65 affixed on the handle 40 whereby the securing means 60 can fasten. The attaching means 65 could be composed of a hook, a snap, a latch, a clamp, or any other securing means. In the preferred embodiment the attaching means 65 is a chain lock or a hook. In the preferred embodiment, the securing means 60 is affixed at one end of the handle 40, and then is placed through the lifting lug and fastened to the attaching means 65 at the opposite end of the handle 40; the securing means 60 forms two sides of a triangle with the handle 40 forming the third side. In this layout the cylinder 100 is more secure on the frame then alternative layouts and cylinder 100 motion side to side is diminished.

In the preferred embodiment the two elongated members 15, 16 are bent at an obtuse angle 70 to the plane intermediate the handle 40 and the base 45. This obtuse angle 70 can be any obtuse angle that would aid the ease of lifting the cylinder 100.

In the preferred embodiment, one elongated member 15 would be longer than the other elongated member, such the base 45 would be primarily composed from one elongated member 15. The length of the two elongated members 15, 16 is such that the second ends 21 of the respective two elongated members 15, 16 interconnect proximal to a curve 30 of one of the two elongated members 15, 16 and distal from the curve 30 of the other elongated member 15, 16; and a depression 95 is in one of the two elongated members 15, 16 proximal the second ends 21.

In the preferred embodiment, the length of one elongated member 15 must be such that when it is placed on one side of the cylinder 100 it extends under the cylinder 100 and out the opposite side of the cylinder 100 such that the second end 21 is not under the cylinder 100. This will aid the user in aligning the second ends 21 without going underneath the cylinder 100. Additionally, the interconnection is simpler whereby the user can interconnect the second ends 20, 21 beside the cylinder 100. The depression 95 can be but is not limited to a dip, a divot, a bend, a saddle or a dent in one of the elongated members 15. In the preferred embodiment the depression 95 is placed in the center of the base 45 between the two curves 30 such that the cylinder 100 when aligned with the depression 95 during use of the transporter is stable. The depression 95 may also be lined with a non-slip or non-marring material.

The transporter 10 may also comprise an extension means affixed by means to said handle 40 whereby extending the frame to facilitate the movement of heavier tanks if necessary. The extension means could be made from the same material used in the transporter 10 and affixed by permanent, such as welding or any other means, or non-permanent means, such as bolting, clipping or clamping or any other means.

This invention further discloses a method of using the transporter 10 to carry and move an article, comprising the steps of placing one of the second ends 21 under an article; aligning the first and second ends 21 of an opposing elongated member with respective the first and second ends 20, 21; interconnecting the first and second ends 20, 21; applying a downward force on the handle 40 such that the base 45 rises lifting the article; and fastening securing means 60 to the article. In the preferred method, the second ends 21 would be aligned and connected prior to the first ends 20. After frame is constructed, the transporter can be moved to the ideal location under the cylinder 100 prior to fastening the securing means 60.

A method further comprising the steps of aligning the article with the depression 95. This invention is for use with articles that have legs 111, or have a shape whereby a part of off the ground, whereby the article is not lifted, instead the apparatus is slid or placed underneath the article without disturbing it.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A transporter comprising:
   a. a frame including at least two elongated members each having a first and second end, each said at least two elongated members is curved proximal said first end and proximal said second end, said first ends are connected by means forming a handle and said second ends are connected by means forming a base;
   b. at least one wheel, affixed by rotatable means to each of said at least two elongated members, intermediate said first and second ends ; the interconnected at least two elongated members are in a plane;
   c. at least one securing means affixed at the handle 40;
   d. the length of the at least two elongated members is such that the second ends of the respective at least two elongated members interconnect proximal to a curve or one of the at least two elongated members and distal from a curve of an other of the at least two elongated members;

e. the first end and the second end of one of the at least two elongated members is formed as a bell joint, to receive and secure the respective opposing first and second ends of the opposing one of said at least two elongated members.

2. A transporter of claim 1 herein:

a. a depression is formed in one of the at least two elongated members proximal said second ends.

3. A transporter of claim 2 wherein:

a. said at least one securing means is a chain.

4. A method of using the transporter of claim 3 to carry and move an article, comprising the steps of:

a. placing of said at least two elongated members under an article;

b. aligning the first and second ends of an opposing one of said at least two elongated members with respective said first and second ends of the one elofngated members;

c. interconnecting said first and second ends;

d. applying a downward force on said handle such that said base rises lifting said article; and e. fastening said securing means to said article.

5. A method of claim 4, further comprising the steps of:

a. aligning said article with said depression.

6. A method of using the transporter of claim 3 to carry and move an article, comprising the steps of:

a. placing the second end of one of said at lest two elongated members under an article;

b. aligning the second end of an opposing one of said at least two elongated members with respective said second end has been inserted after ends;

c. interconnecting said second ends:

d. aligning tie first end of one of said at least two elongated members with the first end of the one elongated member;

e. interconnecting said first ends;

f. applying a downward force on said handle such that said base rises lifting said article; and g. fastening said securing means to said article.

7. A method of claim 6, further comprising the steps of:

a. aligning said article with said depression.

* * * * *